(12) United States Patent
Bedosti et al.

(10) Patent No.: US 10,219,428 B2
(45) Date of Patent: Mar. 5, 2019

(54) DISTRIBUTOR DEVICE OF FERTILIZERS

(71) Applicant: MATERMACC S.P.A., San Vito al Tagliamento (PN) (IT)

(72) Inventors: Andrea Bedosti, Bologna (IT); Claudio Bortolussi, San Vito al Tagliamento (IT)

(73) Assignee: MATERMACC S.P.A., San Vito al Tagliamento (PN) (IT)

(*) Notice: Subject to any disclaimer, the term of this patent is extended or adjusted under 35 U.S.C. 154(b) by 0 days.

(21) Appl. No.: 15/744,382

(22) PCT Filed: Jul. 15, 2016

(86) PCT No.: PCT/IB2016/054223
§ 371 (c)(1),
(2) Date: Jan. 12, 2018

(87) PCT Pub. No.: WO2017/013551
PCT Pub. Date: Jan. 26, 2017

(65) Prior Publication Data
US 2018/0206400 A1      Jul. 26, 2018

(30) Foreign Application Priority Data

Jul. 22, 2015   (IT) ............................ 1020150037114

(51) Int. Cl.
| *A01C 7/04* | (2006.01) |
| *A01C 15/04* | (2006.01) |
| *A01C 7/08* | (2006.01) |
| *B65G 53/16* | (2006.01) |
| *B65G 53/66* | (2006.01) |
| *B65G 53/36* | (2006.01) |

(52) U.S. Cl.
CPC ................ *A01C 15/04* (2013.01); *A01C 7/04* (2013.01); *A01C 7/081* (2013.01); *B65G 53/16* (2013.01); *B65G 53/66* (2013.01); *A01C 7/084* (2013.01); *B65G 53/36* (2013.01)

(58) Field of Classification Search
CPC ....................................................... B65G 53/16
USPC ......................................................... 406/181
See application file for complete search history.

(56) References Cited

U.S. PATENT DOCUMENTS 3,964,639 A * 6/1976 Norris .................... A01C 7/082
                                                           111/176
4,264,242 A * 4/1981 Lecomte ................ A01C 7/084
                                                           111/73

(Continued)

FOREIGN PATENT DOCUMENTS

| DE | 9313779 U1 | 11/1993 |
| DE | 10121910 A1 | 11/2002 |
| DE | 102008050735 A1 | 11/2009 |

*Primary Examiner* — William R Harp
(74) *Attorney, Agent, or Firm* — Volpe and Koenig, P.C.

(57) ABSTRACT

A distributor device of fertilizer substances for a seeder machine includes a storing tank of a fertilizer substance, a plurality of distribution conduits connected to the storing tank, at least one source of high-velocity air connected to the distribution conduits for distributing, in use, the fertilizer substance. The device also includes: at least a connecting element, having at least two infeeds and at least one outfeed, the connecting element being connected to at least two of the distribution conduits so as to convey, in use, the fertilizer substance coming from at least the two distribution conduits to the outfeed.

10 Claims, 2 Drawing Sheets

(56) References Cited

U.S. PATENT DOCUMENTS

| | | | | |
|---|---|---|---|---|
| 4,493,273 | A * | 1/1985 | Gauchet | A01C 7/081 111/154 |
| 4,669,922 | A * | 6/1987 | Hooper | A01C 5/062 111/150 |
| 4,911,090 | A | 3/1990 | Smhimke | |
| 5,265,547 | A | 11/1993 | Daws | |
| 5,379,706 | A * | 1/1995 | Gage | A01C 15/04 111/174 |
| 5,392,722 | A * | 2/1995 | Snipes | A01C 7/082 111/174 |
| 5,522,328 | A * | 6/1996 | Long | A01C 7/082 111/176 |
| 6,499,413 | B2 * | 12/2002 | Kleinknecht | A01C 7/081 111/174 |
| 6,505,569 | B1 * | 1/2003 | Richard | A01C 7/042 111/174 |
| 7,509,915 | B2 * | 3/2009 | Memory | A01C 7/082 111/174 |
| 7,854,205 | B2 * | 12/2010 | Beaujot | A01C 7/081 111/176 |
| D647,542 | S * | 10/2011 | Zwettler | D15/28 |
| 8,757,074 | B2 * | 6/2014 | Cruson | A01C 7/082 111/176 |
| 8,876,439 | B2 * | 11/2014 | Sheehan | B01J 8/0015 198/534 |
| 9,155,243 | B2 * | 10/2015 | Heintzman | A01C 7/082 |
| 9,474,202 | B2 * | 10/2016 | Gilstring | A01C 7/081 |
| 9,533,839 | B2 * | 1/2017 | Nierescher | B65G 53/14 |
| 2002/0144637 | A1 * | 10/2002 | Wendling | A01C 7/042 111/163 |

* cited by examiner

_US 10,219,428 B2_

DISTRIBUTOR DEVICE OF FERTILIZERS

TECHNICAL FIELD

The present invention relates to a distributor device of fertilizer substances especially suitable for application to an agricultural machine, such as for example a seeder.

It is observed that in the following the term "fertilizer" or "fertilizer substances" are intended to mean any product used in agriculture and/or gardening with the aim of creating, reconstituting, conserving or increasing a fertility of a terrain, giving the terrain one or more nutritional elements usable by plants, independently of the form of which the product is constituted, whether granular, powder or fluid. Naturally the term "fertilizer substances" comprises manure, soil amendments and/or corrective substances.

BACKGROUND

Devices are known for the distributing of fertilizers associated to seeder machines, usually transported by an agricultural tractor, together able to realise one or more furrows in the terrain, parallel to one another, to deposit a plurality of seeds in each of the furrows and to reclose the furrow and compact the terrain. A seeder machine of known type comprises a metal frame, usually arranged transversally with respect to the advancement direction of the seeder machine and on which a plurality of seeding units is associated. Each seeding unit comprises one or more tanks, or hoppers, which in use contain the seeds to be distributed on the terrain. The tanks are connected to seed distributing devices, for example pneumatically-activated distributor discs, which deposit one or more seeds at regular intervals in each furrow during the advancement of the seeder. The furrows are opened by furrowing organs, and re-closed and compacted by rollers and/or ploughshares connected to the metal frame of the seeder.

Seeders of known type can comprise, optionally, a distributor device of fertilizers able, in use, to distribute additional substances, such as fertilizers or the like in proximity of the furrows for seeding or internally of the furrows specially realised.

The pneumatic distributors of fertilizers of known type comprise a tank internally of which the fertilizer to be distributed is contained, and a conduit internally of which a high-velocity air current flows, generated by a centrifuge ventilator, usually activated by the tractor itself. The fertilizer is inserted by falling from the tank internally of the conduit and transported in suspension internally of a distribution chamber comprising a bell element. The fertilizer product bounces on the surface of the bell and is then directed towards a plurality of openings, fashioned on the bottom of the distribution chamber. The openings are connected to tubes, each comprising, at an end thereof, a distributor nozzle arranged vertically, with the outlet hole facing the terrain.

For example, document U.S. Pat. No. 5,265,547A discloses a selective creation of tramlines where the metered seed normally delivered through the outlet hose of a row planter unit is diverted by a butterfly valve to one or both of row planter units. The diverting hose from the butterfly valve may be connected to Y-shaped connectors having a passage intersecting with the passage that the metered seed for the adjacent row planter units would normally pass for mixing the metered seed.

For example, document U.S. Pat. No. 4,911,090A discloses a seed boot for air seeders including a cast hollow body having a relatively narrow cylindrical upper end intake into which a seed tube may be clamped. Spreaders may be secured to the bottom or discharge end of the boot and can be used to adjust the spread pattern of the seed and an air release slot or vent is provided in the rear wall of the body to reduce air pressure thus reducing the speed at which the seed strikes the ground thereby reducing bounce.

During the course of the numerous experimentations conducted by the present applicant, it has been found that these fertilizer distributing devices include however some drawbacks which make the use of a pneumatic distributor device less than optimal. One of the main drawbacks is given by the nonuniform distribution of fertilizer substance internally of contiguous furrows, and in particular in furrows filled by nozzles connected to the distribution chamber. In some tests carried out by the present applicant, the quantity of fertilizer distributed into the end furrows internally of a group of four contiguous furrows is greater than the quantity of fertilizer distributed into the two central furrows of the group.

In a first aspect of the present invention, the invention aims to obviate the above-mentioned drawback as well as others.

SUMMARY

With the aim of attaining the above aim the distributor device of the present invention comprises storing means of a fertilizer substance, a plurality of distribution conduits connected to the storing means, at least a source of high-velocity air connected to the distribution conduits for distributing, in use, the fertilizer substance, at least a connecting element, comprising at least two infeeds and at least an outfeed, the connecting element being connected to at least two of the distribution conduits so as to convey, in use, the fertilizer substance coming from at least the two distribution conduits to the at least an outfeed.

With this solution, the distributor device is very efficient in homogeneous distribution of fertilizer substance to each furrow, regardless of the type of fertilizer substance and/or the velocity reached by the seeder machine.

In an aspect of the invention, the connecting element comprises at least a venting device, and, more advantageously, comprises a breather tube connected to the connecting element.

With this solution it is possible to distribute the fertilizer substance very precisely in each furrow.

A further aspect of the invention relates to at least a distribution chamber comprising a plurality of peripheral outlet openings each being connected to one of the distribution conduits.

Still more advantageously, the distribution chamber comprises at least four peripheral outlet openings.

In this way the fertilizer substance can be distributed into two or more contiguous furrows without modifying the other elements of the distributing system of fertilizer substance.

A further aim of the present invention is to disclose a distributor device of fertilizer which is easy to maintain, resistant over time and economical to manufacture.

BRIEF DESCRIPTION OF THE DRAWINGS

Further characteristics and advantages of the present invention will more fully emerge from the following description, made by way of example with reference to the appended figures, in which.

DETAILED DESCRIPTION OF THE PREFERRED EMBODIMENTS

Figure 1:
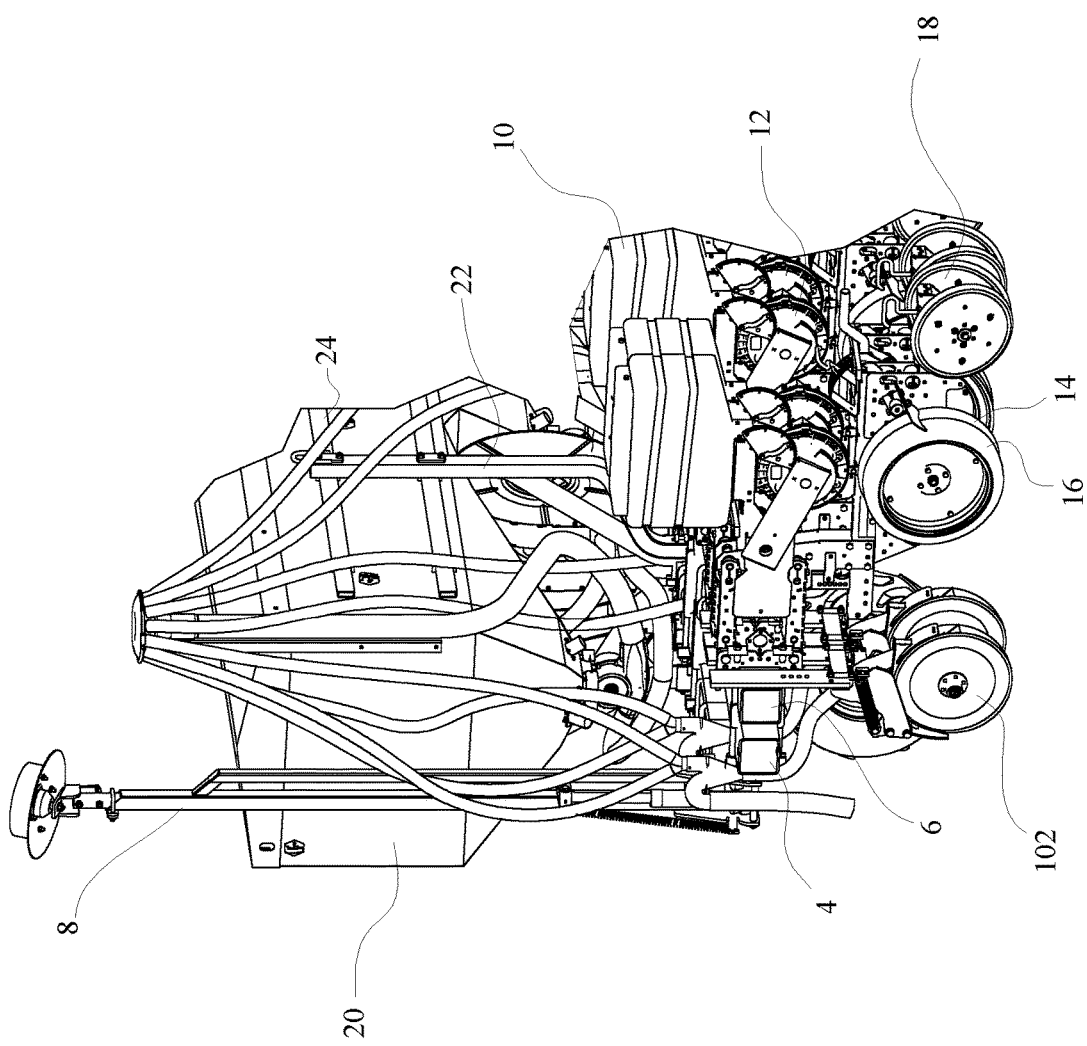
FIG. 1 is a partial perspective view of a seeder machine comprising the distributor device of fertilizer according to the present invention.

The present embodiment relates to a distributor device of fertilizer associated to a seeder machine. However the device of the invention can, in accordance with different embodiments, be applied also to other agricultural machines. With particular reference to the figures, an agricultural seeder machine comprises a main frame, usually made of a metal material, selectively engageable to a tractor machine, for example but not limitedly an agricultural tractor. The main frame is elongate in a preferential direction, substantially perpendicular to the advancement direction of the tractor machine and comprises a rear longitudinal member 4 comprising attaching means, preferably a three-point hitch, for a selective connection thereof to a tractor machine. The main frame comprises a front longitudinal member 6, also preferably made of a metal material, solidly connected to the rear longitudinal member 4. It is naturally possible to include one or more fixed frames, mobile and foldable and/or telescopic, or two or more longitudinal members connected hingedly, without for this reason forsaking the scope of the present invention.

A row breaker 8 can be hinged to each lateral end of the frame, for example hydraulic, mobile between a lowered position and a raised position, as known to the technical expert in the sector.

The agricultural seeder machine comprises a plurality of seeding units connected to the front longitudinal member 6 by means of selective connecting means. Each seeding unit comprises one or more tanks 10, or hoppers, which in use contain the seeds to be distributed on the terrain. The tanks 10 have an upper cover and a lower opening serving a seed distributing member. The distributor discs 12, neither illustrated nor described in detail in the present description, are able to dispense a batched quantity of seeds, for example one seed at a time at regular intervals, in each furrow, in accordance with the advancement velocity of the seeder. The seeder device further comprises furrowing elements, for example but not limitingly a pair of discs 14, and control organs of the seeding depth, for example but not limitingly, a pair of depth wheels 16 located laterally with respect to the fall position of the seed. The seeder device lastly comprises a furrow closing group, arranged downstream of the fall point in the advancement direction of the seeder device. The closing group comprises, for example, but not limitingly, a roller, or levelling ploughshares, or a pair of rotary closing wheels 18, inclined to one another and having an inclined rotation axis with respect to the horizontal.

The agricultural seeder machine according to the present invention further comprises a distributor device of fertilizer substances. The device comprises storing means of fertilizer substances, for example one or more tanks, more preferably one or more hoppers 20. The hopper 20 is connected to the main frame of the seeder, for example superiorly thereof, by means of support organs, for example an upright 22 and a pair of cross members 24 engaged to the upright and the hopper 20. Naturally the number and dimensions of each hopper might vary widely according to the specific use needs of the distributor device of fertilizer substances, and the number and/or shape of the support organs might vary without for this reason forsaking the scope of the present invention. For example, a plurality of hoppers might be included, each containing different fertilizer substances, or a single hopper so as to enable a single and rapid loading of the hopper with the fertilizer substances, or in any case another and different combination of hoppers.

Figure 2:
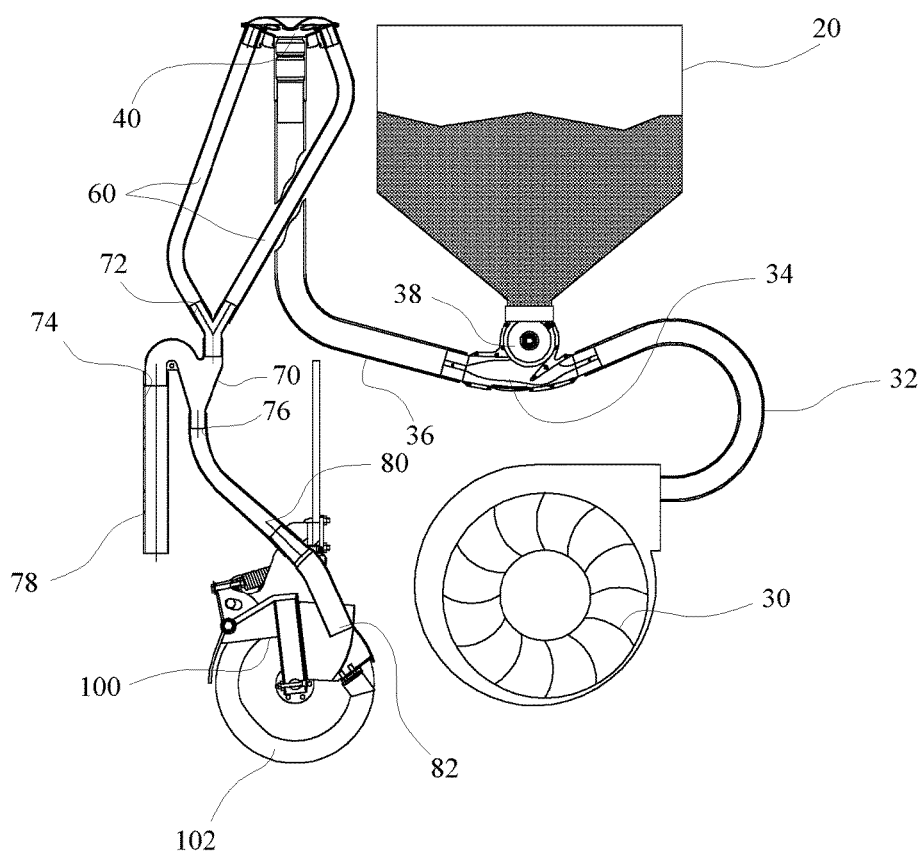
FIG. 2 is a partial perspective view of the distributor device of FIG. 1.

As is more clearly illustrated in FIG. 2, the distributor device of fertilizer substances according to the present invention further comprises one or more sources of high-velocity air, for example but not limitedly, at least a centrifuge ventilator 30 activated by motor means of known type, not illustrated, preferably by the same tractor machine. The ventilator 30 is provided upstream of the hopper 20 in the advancement direction of the high-velocity air. The number of air sources 30 can be linked to the number of hoppers 20 present in the distributor device, or it is possible to include one or more air sources 30 arranged in proximity of different portions of the single hopper 20, for example, but not limitingly, an air source 30 in proximity of each end or one in the centre of the hopper 20. The number and/or the arrangement of the air sources can widely vary and is connected to the volume and the quantity of fertilizer substances to be distributed and batched.

The centrifuge ventilator 30 is connected to a conveyor system comprising one or more tubes 32, for example made of a plastic material, connected to the outfeed of the centrifuge ventilator 30. The tube 32 is in turn connected to a conveyor conduit 36, for example made of a plastic material, through an air divider 34 connected to the lower outfeed of the one or more hoppers 20 and able, in use, to regulate the volume of air internally of the conveyor system. In this way, in use, the fertilizer substance contained in the hopper 20 inserts by force of gravity internally of the air divider 34 and is conveyed internally of the conveyor conduit 36 by the air current coming from the centrifuge ventilator 30.

It is optionally possible to include a batching device of the quantity of fertilizer in outlet from the hopper 20 and in inlet to the air divider 34. For example, the batching device comprises a regulating organ 38 able to increase or reduce the quantity of product batched so as to increase or reduce the quantity of fertilizer which by force of gravity drops internally of the conveyor tube 36. Each conveyor tube 36 is connected at the other end thereof to at least a distribution chamber 40 engaged to the frame or the hopper 20. The distribution chamber 40 comprises a pair of concave discs coupled to one another so as to define internally thereof a distribution space. The upper disc 44 comprises a concave surface with a central projection 50 which defines an annular depression 48 along all the edge portion of the upper disc 44. The lower disc 46 comprises a central inlet opening 52 and a plurality of peripheral outlet openings 54 arranged radially along the whole edge portion of the lower disc 46. One of the ends of the conveyor tube 36 is inserted internally of the opening of the central inlet 52.

Figures 3, 4:
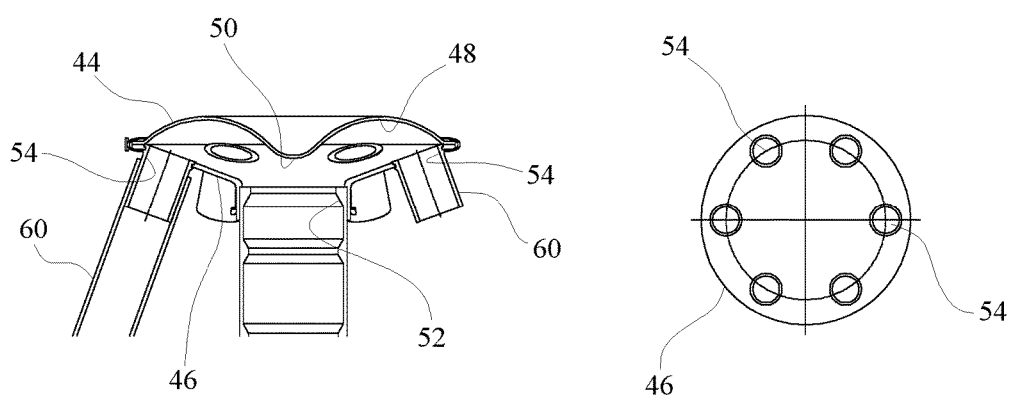
FIG. 3 is a partial longitudinal section view of a distribution chamber according to the present invention.
FIG. 4 is a cross section view of the distribution chamber of FIG. 3.

As illustrated in FIG. 4, one of the preferred embodiments of the present invention comprises at least four outlet openings each fashioned at an angular distance so as to be distributed uniformly along the whole peripheral annular portion of the lower disc. Naturally different arrangements can be included, including angular differences and/or number of peripheral outlet openings, with equal and/or different diameters, without forsaking the scope of the present invention. For example the distribution chamber 40 can comprise eight or ten or twelve outlet openings, or any equal number of outlets more than four. A plurality of distribution conduits 60, preferably flexible tubes made of plastic material, are connected, each with a first end thereof, to the peripheral openings 54 of the distribution chamber 40.

The distributor device of fertilizer substances according to the present invention comprises at least a connecting element 70, for example a manifold, comprising a plurality of infeeds and outfeeds. In the embodiment illustrated in the figures, the connecting element 70 comprises two infeeds, each of which is connected to an end of one of the distribution conduits 60. A first outfeed 74 of the manifold 70 is connected to the air venting device, for example a breather tube 78 of the air conveyed by the conveyor system and coming from the centrifuge ventilator 30. A second outfeed 76 of the manifold 70 is connected to a distributor conduit or tube 80 of the fertilizer substance which in turn comprises at an end thereof, a distributor nozzle 82 arranged vertically, with the outlet hole facing the terrain. The diameter of the breather tube 78 is preferably greater than the diameter of the distributor tube 80 so as to facilitate the air passage in the breather tube 78 and of the fertilizer in the distributor tube 80. This configuration enables the high-velocity air current to evacuate through the breather tube 78 and enables the fertilizer to reach the distributor nozzle 82 at a lower velocity so as not to be dispersed in the environment but to be distributed on the terrain with great precision.

It is naturally possible to have different connecting elements with respect to what is described and illustrated herein as long as the function carried out by the elements remains that of collecting the fertilizer substance coming from two or more distributor tubes and convey it internally of a single distributor nozzle.

The distributor device of fertilizer substances further comprises planting organs of fertilizer substances, for example, a flexible furrower or a double-disc furrower 102. The planting organ comprises a chassis 100, for example made of metal, which is connected to the frame of the seeder, preferably to the front longitudinal member 6 and is able to support, for example, a double-disc furrower 102. As is better visible in FIG. 1, the planting organ is arranged downstream of the distributor discs 12 along the advancement direction of the seeder in a laterally displaced position with respect to the distributor discs so as not to interfere with the furrows in which the seeds are deposited.

The distributor nozzle 82 is engaged to the chassis 100 and arranged in proximity of the planting organs of fertilizer substances, laterally or anteriorly of the double-disc furrower 102.

In use, the fertilizer substance contained internally of the hopper 20 is inserted by force of gravity in the conveyor conduit 36 and transported in suspension internally of the distribution chamber 40. The fertilizer substance bounces against depressions 48 of the upper disc 44 of the distribution chamber 40 and is directed towards the openings 54 fashioned on the lower disc 46 and entrained into the distribution conduits 60 through the outfeeds 54. Once the end of the conduits has been reached, the fertilizer substance is collected in the manifold 70, the air is evacuated through the breather tube 78 and the fertilizer substance distributed by the distributor nozzle 82 internally of the furrow realised by the planting organs 102.

As mentioned, the experimentations conducted by the present applicant have yielded surprising results using a distribution chamber with four, six, eight, twelve or more outlets connected, respectively, to four, six, eight, twelve or more distribution channels and connected two by two, at the ends thereof, by three or four manifolds, so that each distribution chamber is able to distribute and batch fertilizer substance into two, three or four, six or more contiguous furrows. Naturally it is possible also to provide different configurations and combinations in regard to the distribution channels as long as the device comprises a connecting element able to convey, in use, the fertilizer substance coming from two or more distribution conduits to a single distributor nozzle. All the details can be substituted by other technically-equivalent elements. Likewise, the materials used, as well as the forms and dimensions thereof, can be any according to needs without for this reason forsaking the scope of protection of the following claims.

The invention claimed is:

1. A distributor device of fertilizer substances comprising a storing tank (20) of a fertilizer substance, a plurality of distribution conduits (60) connected to the storing tank (20), at least a source of high-velocity air (30) connected to the distribution conduits (60) for distributing, in use, the fertilizer substance onto a terrain, the device further comprising:

at least a distribution chamber (40) comprising a plurality of peripheral outlet openings (54) each being connected to one of the distribution conduits (60), a distributor tube (80) directly connected at one side to one or more distribution conduits (60) and at another side to a distributor nozzle (82) to enable the high-velocity air current to evacuate the fertilizer substance on the terrain, at least a connecting element (70), comprising at least two infeeds (72) and at least one outfeed (76), the connecting element (70) being connected to at least two of the distribution conduits (60) so as to convey, in use, the fertilizer substance coming from the at least two distribution conduits (60) to the at least outfeed (76), wherein the distributor device further comprises a breather tube (78) connected to the distributor tube (80) and disposed between the distribution conduits (60) and the distributor tube (80).

2. The device of claim 1, wherein the breather tube (78) has a diameter that is greater than a diameter of the distributor tube (80) so as to facilitate air passage in the breather tube (78) and of the fertilizer in the distributor tube (80).

3. The device of claim 2, wherein the distributor tube (80) is connected to at least two of the distribution conduits (60) connected in turn to the at least one distribution chamber (40).

4. The device of claim 3, wherein the distribution chamber (40) is connected to a conveyor conduit (36) of the fertilizer substance, the conveyor conduit (36) being connected to the storing tank (20).

5. The device of claim 4, wherein the distribution chamber comprises a concave upper disc (44) and a concave lower disc (46), coupled to one another, wherein the upper disc (44) comprises a concave surface with a central projection (50) which defines an annular depression (48) along an entire edge portion of the upper disc (44).

6. The device of claim 5, wherein the upper concave disc (44) and the lower concave disc (46) are disposed facing oppositely.

7. The device of claim 5, wherein the concave surface of the upper disc (44) in the edge portion is directed downwardly and the concave surface of the lower disc (46) in the edge portion is directed upwardly.

8. The device of claim 4, wherein the source of high-velocity air (30) is arranged upstream of the storing tank (20)

which is located upstream of the distribution chamber (40), which is located upstream of the connecting element (70) in the advancing direction of the high-velocity air current.

9. The device of claim 3, wherein the distribution chamber comprises at least four peripheral outlet openings (54).

10. A distributor device of fertilizer substances comprising a storing tank (20) of a fertilizer substance, a plurality of distribution conduits (60) connected to the storing tank (20), at least a source of high-velocity air (30) connected to the distribution conduits (60) for distributing, in use, the fertilizer substance, the device further comprising:

at least a distribution chamber (40) comprising a plurality of peripheral outlet openings (54) each being connected to one of the distribution conduits (60), a distributor tube (80) directly connected at one side to one or more distribution conduits (60) and at another side to a distributor nozzle (82) to enable the high-velocity air current to evacuate the fertilizer substance on the terrain, wherein the distributor device further comprises a breather tube (78) connected to the distributor tube (80) and disposed between the one or more distribution conduits (60) and the distributor tube (80), the breather tube (78) having a counter slope direction with respect to the distributor conduit (60).

* * * * *